US009889608B2

(12) United States Patent
Cudak et al.

(10) Patent No.: US 9,889,608 B2
(45) Date of Patent: Feb. 13, 2018

(54) MATCHING THE SCALE OF INDEPENDENT OBJECTS OR INTELLIGENTLY SCALING OBJECTS WHEN 3D PRINTING

(71) Applicant: International Business Machines Corporation, Armonk, NY (US)

(72) Inventors: Gary D. Cudak, Wake Forest, NC (US); Luis J. Flores, Houston, TX (US); Christopher J. Hardee, Raleigh, NC (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 14/537,138

(22) Filed: Nov. 10, 2014

(65) Prior Publication Data

US 2016/0129635 A1    May 12, 2016

(51) Int. Cl.
*G05B 19/4099* (2006.01)
*B29C 67/00* (2017.01)
(Continued)

(52) U.S. Cl.
CPC ......... *B29C 67/0088* (2013.01); *B25J 9/1679* (2013.01); *G05B 19/4099* (2013.01);
(Continued)

(58) Field of Classification Search
CPC ............... B25J 9/1679; G05B 19/4099; G05B 2219/49007; B29C 67/0088
See application file for complete search history.

(56) References Cited

U.S. PATENT DOCUMENTS 6,490,496 B1   12/2002   Dacey
7,231,275 B2   6/2007   Silverbrook
(Continued)

FOREIGN PATENT DOCUMENTS

WO   WO2011042899 A1   4/2011
WO   WO2012146943 A2   11/2012
WO   WO2013113372 A1   8/2013

OTHER PUBLICATIONS

Richard A. D'Aveni, "3-D Printing Will Change the World", Harvard Business Review, 3-D Printing Will Change the World—Harvard Business Review, http://hbr.org/2013/03/3-d-printing-will-change-the-world/, Mar. 3, 2013, 6 pages.

*Primary Examiner* — Charles E Anya
(74) *Attorney, Agent, or Firm* — Jeffrey L. Streets

(57) ABSTRACT

A computer program product includes a computer readable storage medium having program instructions embodied therewith, where the program instructions are executable by a processor to cause the processor to perform a method. The method includes identifying a first data file that includes first dimensions that may be used by a three-dimensional printer to form a physical three-dimensional model of a first object, identifying a second data file that includes second dimensions that may be used by a three-dimensional printer to form a physical three-dimensional model of a second object, determining a proportionality factor between the first dimensions and the second dimensions, multiplying the dimensions in the second data file by the proportionality factor, and causing the three-dimensional printer to form a physical three-dimensional model of the second object using the scaled dimensions.

19 Claims, 5 Drawing Sheets

(51) Int. Cl.
*B25J 9/16* (2006.01)
*B33Y 50/02* (2015.01)

(52) U.S. Cl.
CPC ..... *B33Y 50/02* (2014.12); *G05B 2219/49007* (2013.01); *G05B 2219/49008* (2013.01)

(56) References Cited

U.S. PATENT DOCUMENTS

| | | | |
|---|---|---|---|
| 8,175,734 B2 | 5/2012 | Fogel et al. | |
| 2002/0059049 A1 | 5/2002 | Bradbury et al. | |
| 2005/0069682 A1* | 3/2005 | Tseng | G05B 19/4099 428/195.1 |
| 2006/0087698 A1* | 4/2006 | Allen | H04N 1/409 358/3.26 |
| 2011/0242607 A1 | 10/2011 | Shenoy et al. | |
| 2012/0002226 A1* | 1/2012 | Zhan | G06F 3/1205 358/1.11 |
| 2013/0077113 A1* | 3/2013 | Rolleston | G06F 3/1208 358/1.13 |
| 2013/0124151 A1* | 5/2013 | Mech | G06F 17/50 703/1 |
| 2015/0042755 A1* | 2/2015 | Wang | B29C 67/0088 348/46 |
| 2015/0148930 A1* | 5/2015 | Kumar | G06T 19/20 700/98 |
| 2015/0379722 A1* | 12/2015 | Goldberg | G06F 17/60 382/298 |

* cited by examiner

MATCHING THE SCALE OF INDEPENDENT OBJECTS OR INTELLIGENTLY SCALING OBJECTS WHEN 3D PRINTING

BACKGROUND

Field of the Invention

The present invention relates to methods of three-dimensional printing.

Background of the Related Art

Three-dimensional (3D) printing is a process of making a three-dimensional object from a digital model using an additive process, where successive layers of material are laid down over previous layers. The material may be a thermoplastic polymer filament that is heated and extruded through a narrow nozzle. In one type of three-dimensional printer, the nozzle, the table supporting the material, or both is moved to control where the material is deposited. Other types of three-dimensional printers may use alternative mechanisms to control the position of a nozzle for dispensing the material.

3D printing is becoming a big industry with a growing number of printer manufacturers and web sites that provide construction plans in the form of a data file for downloading to a computer. Unfortunately, 3D printing is much more complex than 2D printing and requires much more time to produce an object. Objects that are printed at a fine level of detail and are not tiny can take many hours to complete. Ideally, a 3D print job is not started unless there is enough time and materials to complete the job.

BRIEF SUMMARY

One embodiment provides a computer program product comprising a computer readable storage medium having program instructions embodied therewith, where the program instructions are executable by a processor to cause the processor to perform a method. The method comprises identifying a first data file that includes first dimensions that may be used by a three-dimensional printer to form a physical three-dimensional model of a first object, identifying a second data file that includes second dimensions that may be used by a three-dimensional printer to form a physical three-dimensional model of a second object, determining a proportionality factor between the first dimensions and the second dimensions, multiplying the dimensions in the second data file by the proportionality factor, and causing the three-dimensional printer to form a physical three-dimensional model of the second object using the scaled dimensions.

DETAILED DESCRIPTION

Figure 1:
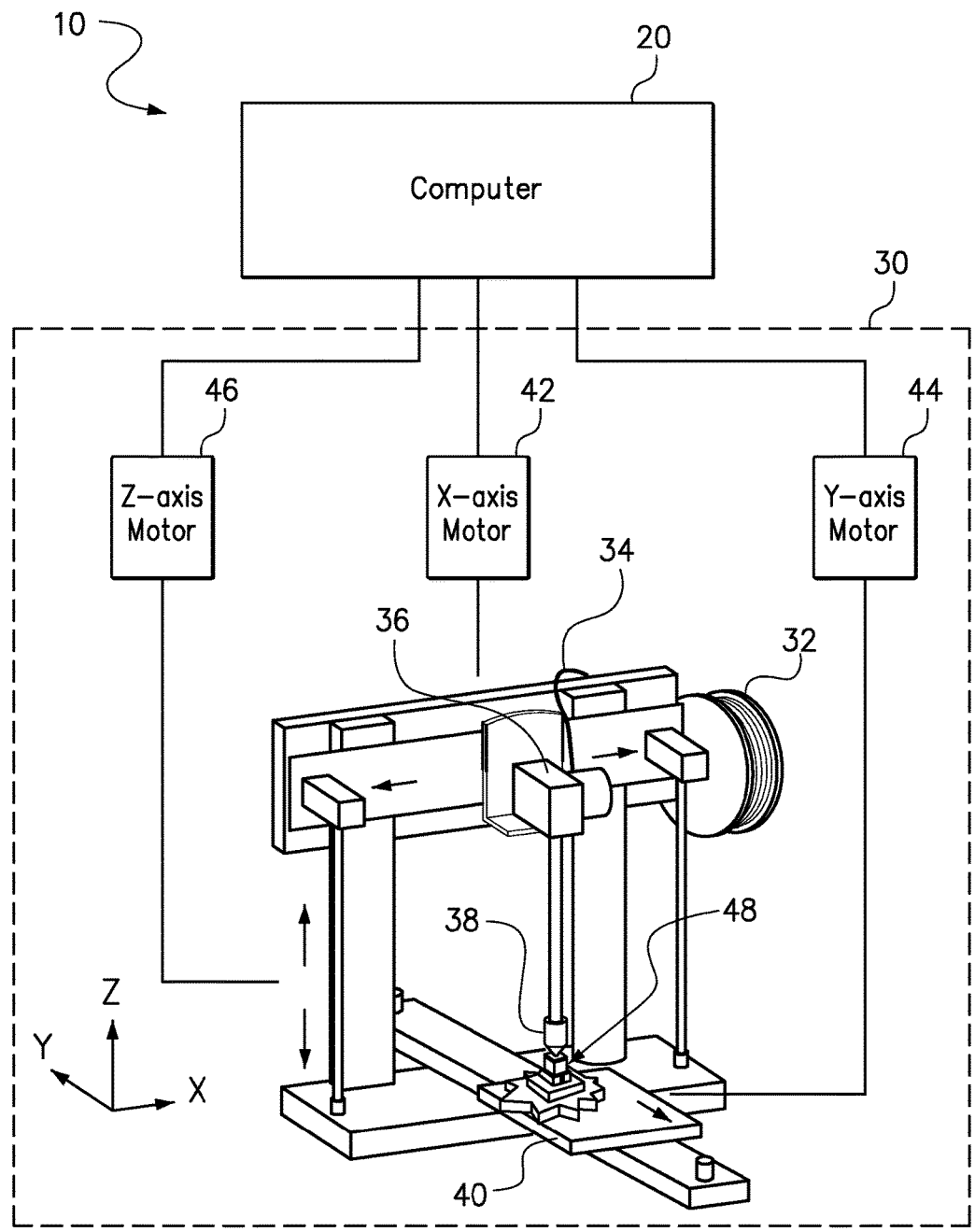
FIG. 1 is a diagram of a computer controlling a three-dimensional printer.

One embodiment provides a computer program product comprising a computer readable storage medium having program instructions embodied therewith, where the program instructions are executable by a processor to cause the processor to perform a method. The method comprises identifying a first data file that includes first dimensions that may be used by a three-dimensional printer to form a physical three-dimensional model of a first object, identifying a second data file that includes second dimensions that may be used by a three-dimensional printer to form a physical three-dimensional model of a second object, determining a proportionality factor between the first dimensions and the second dimensions, multiplying the dimensions in the second data file by the proportionality factor, and causing the three-dimensional printer to form a physical three-dimensional model of the second object using the scaled dimensions.

According to one optional feature, the dimensions in the first data file may be historical dimensions that were previously used by the three-dimensional printer to form a physical three-dimensional model of the first object. In other words, the first data file describes the actual dimensions that the printer used when forming a particular three-dimensional model of the first object, rather than simply the intended dimensions of the first object. For example, if a data file is being used to form a print job and the dimensions in the data file are scaled at the time of printing, such as to fit within a print envelope of the three-dimensional printer or to match the scale of another data file, then the actual dimensions used may be recorded in the first data file, either replacing the original dimensions or appending the original dimensions with the actual dimensions of this model or any number of models that may be formed over time. Alternatively, the method may maintain a separate database of completed print jobs and the actual dimensions and other parameters used to form the object. Still further, the first data file may also include parameters that were previously used by the three-dimensional printer to form the physical three-dimensional model of the first object, wherein the parameters are selected from scale value, color, texture, and material. These parameters may reflect the type and amount of material that was available at the time the model was formed, or the capabilities of the three-dimensional printer that was used to form the model. The scale value may be a ratio of the dimensions in the first data file to dimensions of a full scale instance of the first object, or a percentage of a maximum print envelope of the three-dimensional printer.

According to another optional feature, the method may generate and display a first image of the first object as described by the first data file and a second image of the second object as described by the second data file, wherein the dimensions of the first image are proportional to dimensions in the first data file and the dimensions of the second image are proportional to the dimensions in the second data file, and wherein determining a proportionality factor between the first dimensions and the second dimensions, includes accepting user input that is determinative of the proportionality factor. For example, the user input may modify the relative sizes of the first and second images, such as using mouse or track pad to click-and-drag a portion of the first or second image such that the image is resized relative to the other image. The extent of the resizing becomes the proportionality factor. Alternatively, the user input may identify a first feature of the first image and a second feature of the second image that should be the same dimensions. For instance, if you have printed a chair and are about to print a figure of a person, you can use the section of the figure (person) from the foot to the knee as compared to the height of the seat on the chair to set the relative size of the two objects. The amount of resizing that would need to occur for first feature to be the same dimensions as the second feature becomes the proportionality factor. In some instances, the second data file may include a dimensional limitation specified by an author of the second data file, and the method may therefore notify the user that the dimensional limitation of the second data file prohibits forming the second object using the proportionality factor. Presumably, the user would provide further input until arriving at a proportionality factor that did not violate the dimensional limitation.

Embodiments of the method may further include scaling the dimensions of both the first data file and the second data file so that the first dimensions of the three-dimensional model of the first object and the second dimensions of the three-dimensional model of the second object do not exceed dimensions of a print envelop of the three-dimensional printer, wherein the proportionality factor between the first dimensions and the second dimensions is maintained. Scaling of the dimensions in this manner assure that the scaled three-dimensional models of the first and second objects can actually be formed within the print envelop of the three-dimensional printer prior to submitting the first print job to the printer.

A still further optional feature of the method addresses the use of multiple three-dimensional printers, where the first object may be formed by the first three-dimensional printer and the second object may be formed by the second three-dimensional printer. The method may further comprise scaling the dimensions of the first data file so that dimensions of the three-dimensional model of the first object do not exceed dimensions of a print envelop of a first three-dimensional printer, and scaling the dimensions of the second data file so that dimensions of the three-dimensional model of the second object do not exceed dimensions of a print envelop of a second three-dimensional printer, wherein the proportionality factor between the first dimensions and the second dimensions is maintained. For example, if the second printer has a small print envelope and causes the dimensions of the second data file to be further scaled down, then maintaining the proportionality factor between the first dimensions and the second dimensions means that the dimensions of the first data file will need to be similarly scaled down even though the first three-dimensional printer has a sufficiently large print envelop to form the three-dimensional model of the first object prior to further scaling. Ultimately, the method instructs the first three-dimensional printer to form the three-dimensional model of the first object using the scaled dimensions of the first data file, and instructs the second three-dimensional printer to form the three-dimensional model of the second object using the scaled dimensions of the second data file.

Yet another optional feature of the method may identify a resolution capability of the three-dimensional printer, identify a resolution required by the first data file and the second data file, and scale the dimensions of the first data file and the second data file so that the three-dimensional printer can form the three-dimensional model of the first object and the three-dimensional model of the second object with the required detail level while maintaining the proportionality factor between the first and second objects.

In various embodiments, the first or second data file may include parameters that specify one or more color for the three-dimensional model. In one option, the method may modify a second color specified in the second data file to match a first color specified in the first data file. Furthermore, the method may modify at least a third color specified in the second data file to maintain a relative color association between the second color and the third color in response to the second color being modified to match the first color. For instance, a user may want to print a piece of three-dimensional jewelry that has three colors in it. One of the colors may be matched to the color of another object, and the other two colors may be modified so that the three colors specified in the data file for the jewelry object maintain the same relative difference in color. In another option, the method may substitute a second color for a first color specified in either the first data file or the second data file according to a predetermined color substitution rule. In a further option, the method may substitute a predetermined color for a first color specified in either the first data file or the second data file in response to the first data file or the second data file specifying a predetermined object type. For example, if the data file specified the color brown and that the object type was silverware, then a predetermined rule that all silverware should be silver would cause the specified color to be substituted with silver.

Another optional feature of the method may include scaling the dimensions of the first data file or the second data file by a further predetermined amount in response to the first data file or the second data file specifying a predetermined origin. For example, all of the printable data files from a given company may be twice as big as the user desires, such that a rule is established that any data file from the given company should be scaled down to half size.

Still further, the method may create the first data file from a picture of the first object including at least one known dimension or reference dimension. For example, a picture of the first object may be taken with a ruler or other object of a known size laying beside the first object.

Embodiments of the method may also substituting a lighter weight material for a first material specified in either the first data file or the second data file and filling internal voids specified the first data file or the second data file in order to increase the weight of the three-dimensional model of the first object or the three-dimensional model of the second object. A data file may identify a material and an expected weight for the three-dimensional model of the object, as well as identify whether the object should be hollow or solid. The material, weight and construction are interrelated. If a lighter weight material is be used but it is desired to keep the weight the same or similar to what is specified in the data file, then the construction can be changed from hollow to solid. For example, the pieces of a chess set will preferably feel similar. If one piece is to be made with a lighter weight material than the other pieces, then the one piece may be made solid in order to increase the weight. The method may calculate a range of possible weights for each object given a range of materials and possible construction changes.

FIG. 1 is a diagram of a system 10 including a computer 20 controlling a three-dimensional printer 30. This three-dimensional printer 30 includes a filament spool 32 for supplying a plastic filament 34 into an extruder 36. The heated plastic is pushed through a nozzle 38 onto a print bed or table 40 where the object is printed. As shown, the object 48 has already received a number of layers of plastic material, such that the nozzle is some distance above the table 40.

The position of the tip of the nozzle 38 determines where a thin layer of the plastic material will be placed. As the plastic passes through the nozzle 38, the nozzle 38 may be moved back and forth along an X-axis by an X-axis motor 42, and the table 40 may be moved back and forth along a Y-axis by a Y-axis motor 44. As each layer has been completed in the X-Y plane, the table may be moved down along a Z-axis by a Z-axis motor 46 so that another layer of the plastic may be applied through the nozzle moving in along the X-axis while the object or work piece is moved along with the table along the Y-axis. The printer also includes structural members that guide the nozzle along the X-axis, guide the table along the Y-axis, and guide the table along the Z-axis. The computer 20 provides instructions to the printer 30 to operate the X-axis motor 42, the Y-axis motor 44, and the X-axis motor 46 in a manner that positions the nozzle 38 where is can progressively build the object.

Figure 2:
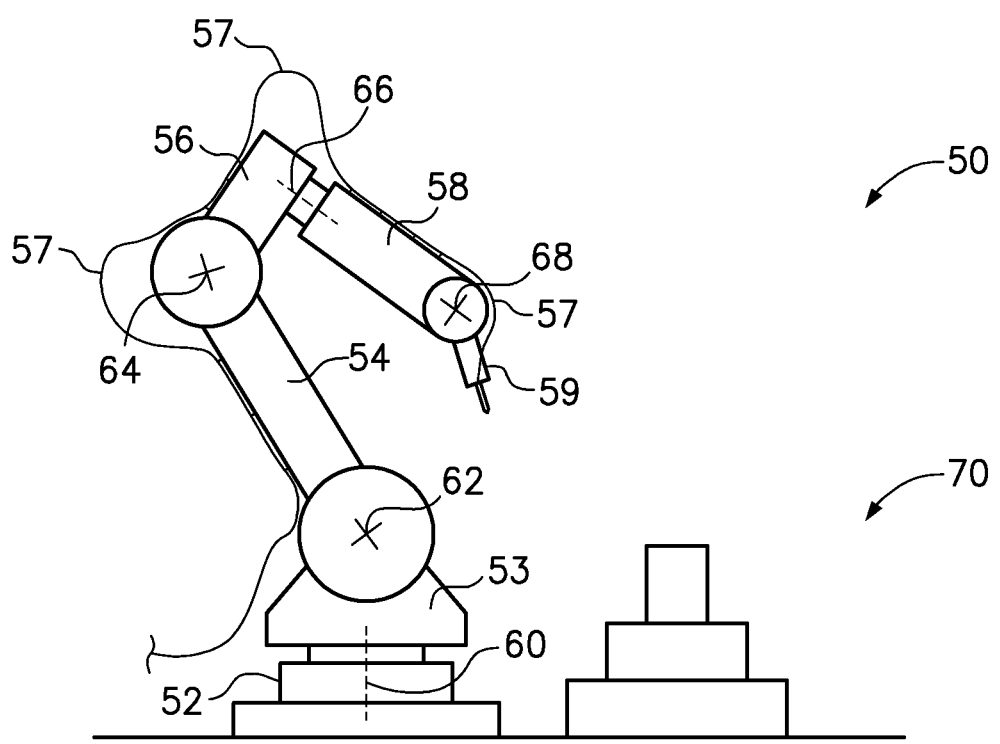
FIG. 2 is a diagram of a computer according to one embodiment of the present invention.

FIG. 2 is a diagram of an alternative three-dimensional printer 50. The 3D printer 50 has a stable base 52 and various arms 54, 56, 58. The base and the arms are pivotally coupled with various axis. For example, the base 52 has a vertical axis 60 so that an upper portion 53 of the base, as well as the entire assembly above the upper portion 53, can rotate. The upper portion 53 of the base and the first arm 54 are pivotally coupled about a first horizontal axis 62, and the first arm 54 is pivotally coupled to the second arm 56 about a second horizontal axis 64. The second arm 56 and the third arm 58 are pivotally coupled about the axis 66, which is perpendicular to the axis 66. Further still, the nozzle 59 is pivotally coupled to the third arm 58 about the axis 68. The pivot angle between each pair of the foregoing components can be independently controlled by a motor receiving control signals from a computer or similar controller. Accordingly, the tip of the nozzle 59 can be positioned to dispense material in three-dimensions and in various angular orientations. In the embodiment shown, the material is delivered to the nozzle 59 through a tube 57 from a material source (not shown). The three-dimensional printer 50 is operated under computer control to position the nozzle 59 to print material to form a three-dimensional model of an object. The flow of material through the nozzle 59 may be controlled by a pump (not shown) and/or a valve (not shown) receiving control signals from the computer.

Figure 3:
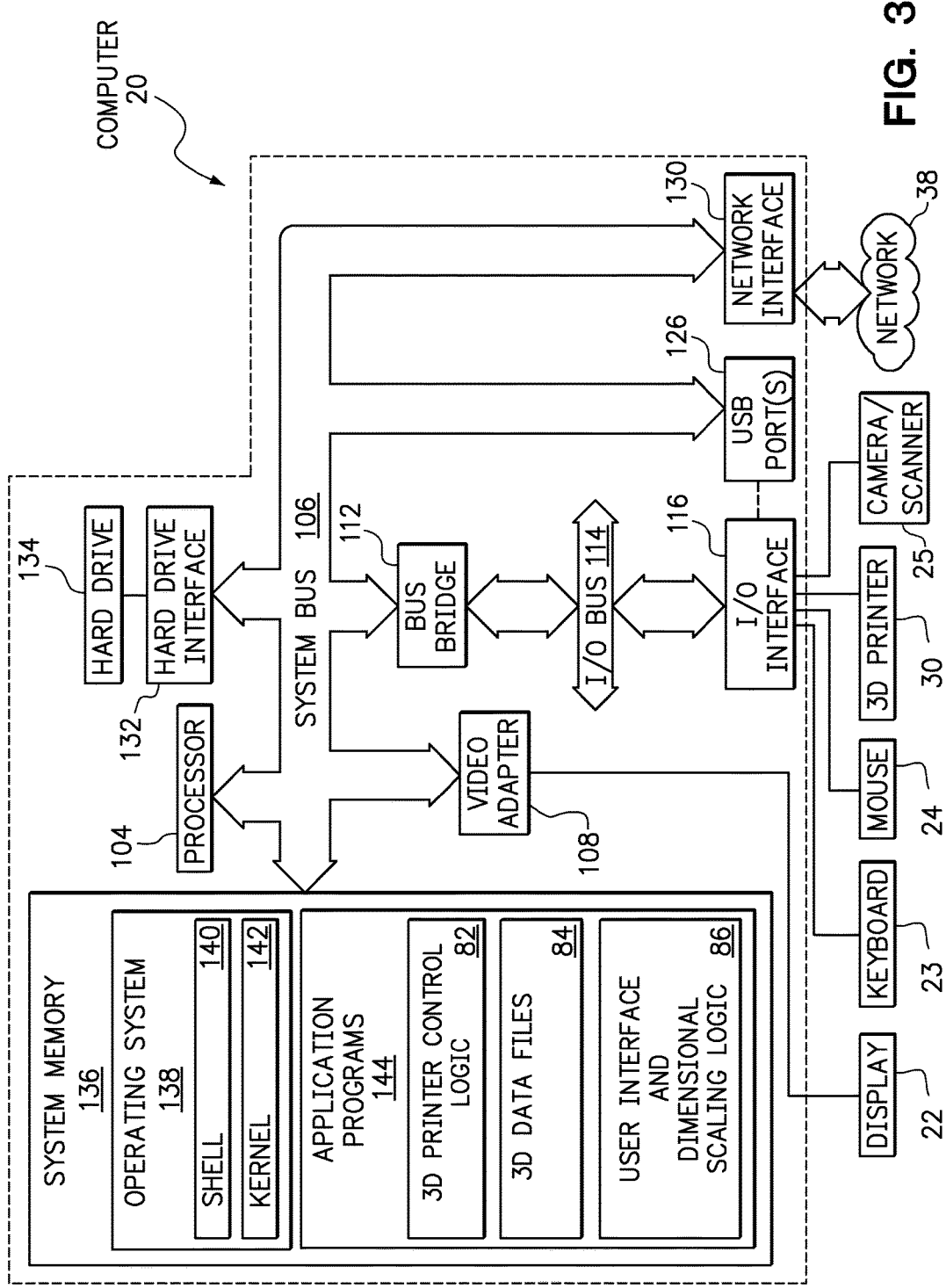
FIG. 3 is a diagram of an alternative three-dimensional printer.

FIG. 3 is a diagram of an exemplary computer 20 that may be used in accordance with one embodiment of the present invention. The computer 20 includes a processor unit 104 that is coupled to a system bus 106. Processor unit 104 may utilize one or more processors, each of which has one or more processor cores. A video adapter 108, which drives/supports a display 22, is also coupled to system bus 106. The system bus 106 is coupled via a bus bridge 112 to an input/output (I/O) bus 114. An I/O interface 116 is coupled to I/O bus 114. I/O interface 116 affords communication with various I/O devices, including a keyboard 23, a mouse 24, a camera or scanner 25 and a 3D printer 30. The I/O devices may optionally include storage devices, such as CD-ROM drives and multi-media interfaces, other printers, and external USB port(s). While the format of the ports connected to I/O interface 116 may be any known to those skilled in the art of computer architecture, in a preferred embodiment some or all of these ports are universal serial bus (USB) ports. As depicted, the computer 20 is able to communicate over a network 38 using a network interface 130. The network 38 may be an external network, such as the global communication network, and perhaps also an internal network such as an Ethernet LAN or a virtual private network (VPN).

A hard drive interface 132 is also coupled to system bus 106 and interfaces with a hard drive 134. In a preferred embodiment, the hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes the computer's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for OS 138, including providing essential services required by other parts of OS 138 and application programs 144, including memory management, process and task management, disk management, and mouse and keyboard management. The application programs 144 in the system memory of the computer 20 may include various programs and modules for implementing the methods described herein, such as the 3D printer control (print driver) logic 82, the 3D data files 84, and user interface and dimensional scaling logic 86.

The hardware elements depicted in computer 20 are not intended to be exhaustive, but rather are representative components suitable to perform the processes of the present invention. For instance, computer 20 may include alternate memory storage devices such as magnetic cassettes, digital versatile disks (DVDs), Bernoulli cartridges, and the like. These and other variations are intended to be within the spirit and scope of the present invention.

Figure 4:
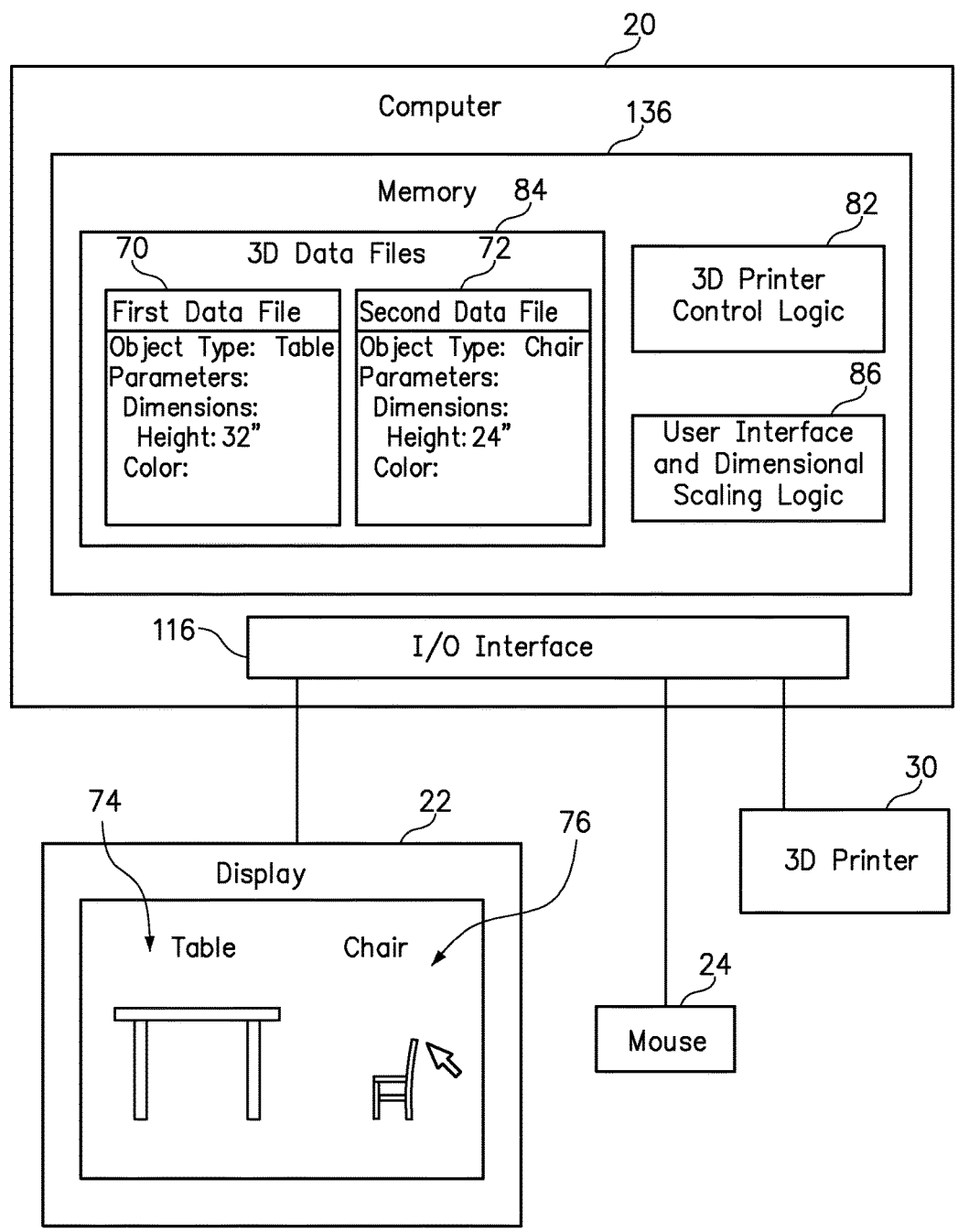
FIG. 4 is a diagram illustrating one manner of providing user input that determines the proportionality factor between a first data file and a second data file.

FIG. 4 is a diagram illustrating one manner of providing user input that determines the proportionality factor between a first data file and a second data file. Consistent with FIG. 3, FIG. 4 shows the computer 20 including memory 136 and an I/O interface 116 that is coupled to a display 22, mouse 24 and 3D printer 30. Similarly, the memory 136 includes the 3D printer control (print driver) logic 82, the 3D data files 84, and user interface and dimensional scaling logic 86.

The 3D data files 84 include at least a first data file 70 and a second data file 72. Both data files 70, 72 include various parameters about an object that may be printed on the three-dimensional printer using the data file. For example, the first data file 70 includes an "object type" parameter which is a "table", and various other parameters, such as material, color, dimensions, and the like. While many parameters are not shown, the first data file 70 shows a height dimension of 32 inches. In this example, the second data file 72 includes an "object type" parameter which is a "chair", and various other parameters, such as material, color, dimensions, and the like. While many parameters are not shown, the second data file 72 shows a height dimension of 24 inches.

Continuing with this example, a proportionality factor between the first dimensions and the second dimensions may be determined by user input. As shown, the computer 20 executes the user interface and dimensional scaling logic 86 to generate and display a first image 74 of the first object as described by the first data file 70 and a second image 76 of the second object as described by the second data file 72. The dimensions of the first image 74 are proportional to dimensions (i.e., height of 32 inches) in the first data file 70 and the dimensions of the second image 76 are proportional to the dimensions (i.e., height of 24 inches) in the second data file 72.

The computer 20 receives user input from the mouse 24, which may be used to modify the relative sizes of the first and second images. 74, 76. For example, the mouse may be used to click-and-drag on a portion of the second image 76 (the chair) in order to resize the image of the chair so that the relative sizes chair and the table are as desired. For example, it might be desirable to form the chair at about twice the displayed size relative to the displayed size of the table. The percentage increase in the second image 76 resulting from the user input is the proportionality factor. The dimensions in the second data file 72 are then multiplied by the proportionality factor when preparing a print job for printing a three-dimensional model of the second object (the chair). Accordingly, the three-dimensional printer may be instructed to form a physical three-dimensional model of the second object using the scaled dimensions. Once the first and second objects are both printed, they should be in the same relative proportions specified by the user input on the display.

Figure 5:
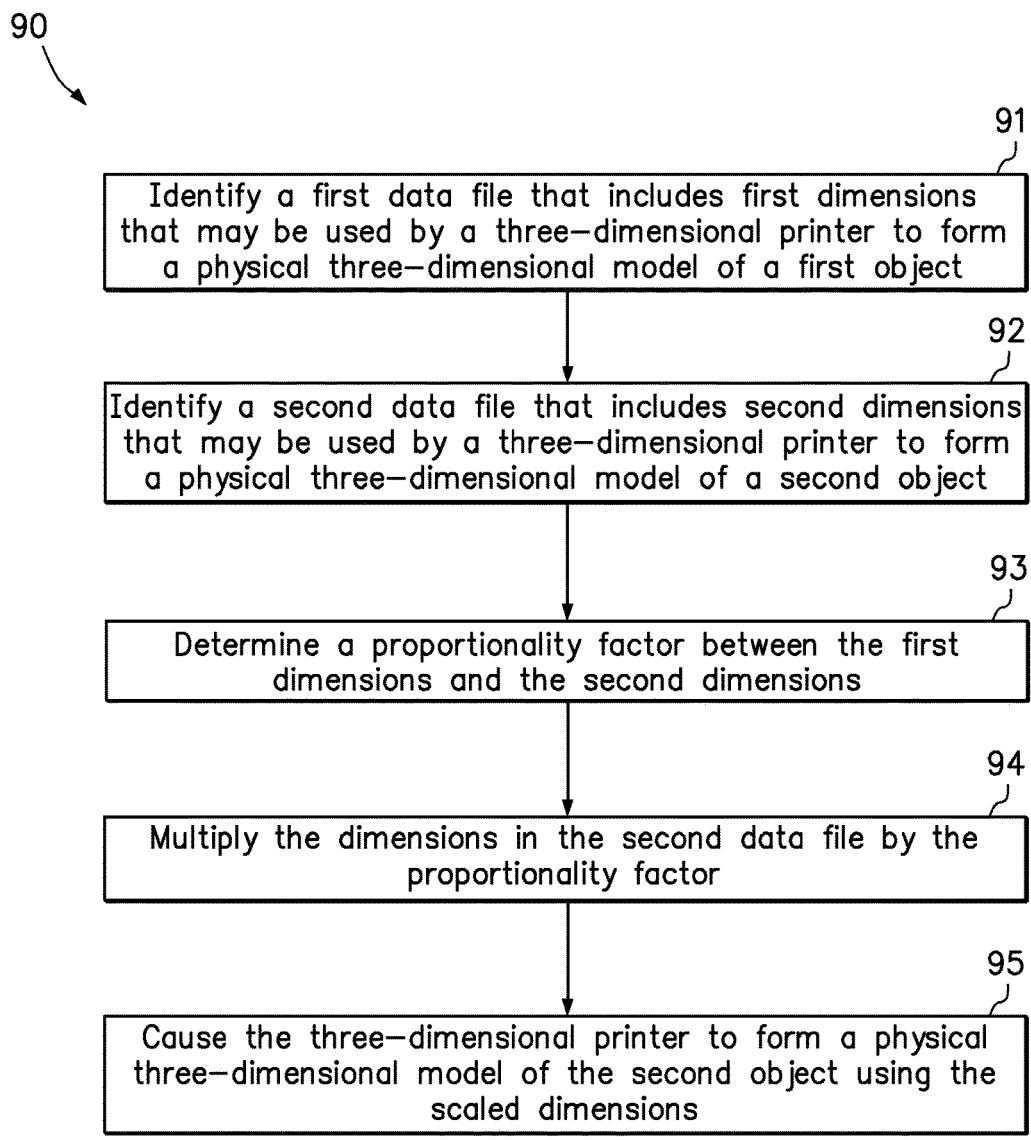
FIG. 5 is a flowchart of a method in accordance with one embodiment of the present invention.

FIG. 5 is a flowchart of a method 90. In step 91, the method identifies a first data file that includes first dimensions that may be used by a three-dimensional printer to form a physical three-dimensional model of a first object. In step 92, the method identifies a second data file that includes second dimensions that may be used by a three-dimensional printer to form a physical three-dimensional model of a second object. Step 93 determines a proportionality factor between the first dimensions and the second dimensions. The dimensions in the second data file are multiplied by the proportionality factor in step 94, and the three-dimensional printer is instructed to form a physical three-dimensional model of the second object using the scaled dimensions in step 95.

The foregoing computer program products may further include computer readable program code for implementing or initiating any one or more aspects of the methods described herein. Accordingly, a separate description of the methods will not be duplicated in the context of a computer program product.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having program instructions embodied therewith for printing an object with a three-dimensional printer, the program instructions executable by a processor to cause the processor to perform a method comprising:
    identifying a first data file that includes first dimensions that may be used by a three-dimensional printer to form a physical three-dimensional model of a first object;
    identifying a second data file that includes second dimensions that may be used by a three-dimensional printer to form a physical three-dimensional model of a second object;
    determining a proportionality factor between the first dimensions and the second dimensions, wherein the proportionality factor includes a fraction or percentage increase or decrease in the second dimensions;
    multiplying the dimensions in the second data file by the proportionality factor; and
    causing the three-dimensional printer to form a physical three-dimensional model of the second object using a product of the multiplication of the second dimensions.

2. The computer program product of claim 1, wherein the dimensions in the first data file are historical dimensions that were previously used by the three-dimensional printer to form a physical three-dimensional model of the first object.

3. The computer program product of claim 2, wherein the first data file includes parameters that were previously used by the three-dimensional printer to form the physical three-dimensional model of the first object, wherein the parameters are selected from scale value, color, texture, and material.

4. The computer program product of claim 3, wherein the scale value is a ratio of the dimensions in the first data file to dimensions of a full scale instance of the first object.

5. The computer program product of claim 3, wherein the scale value is a percentage of a maximum print envelope of the three-dimensional printer.

6. The computer program product of claim 1, further comprising:
    generating and displaying a first image of the first object as described by the first data file and a second image of the second object as described by the second data file, wherein the dimensions of the first image are proportional to dimensions in the first data file and the dimensions of the second image are proportional to the dimensions in the second data file, and wherein determining a proportionality factor between the first dimensions and the second dimensions, includes accepting user input that is determinative of the proportionality factor.

7. The computer program product of claim 6, wherein the user input modifies the relative sizes of the first and second images.

8. The computer program product of claim 6, wherein the user input identifies a first feature of the first image and a second feature of the second image that should be the same dimensions.

9. The computer program product of claim 6, wherein the second data file includes a dimensional limitation specified by an author of the second data file, the method further comprising:

notifying the user that the dimensional limitation of the second data file prohibits forming the second object using the proportionality factor.

10. The computer program product of claim 1, further comprising:
scaling the dimensions of both the first data file and the second data file so that the first dimensions of the three-dimensional model of the first object and the second dimensions of the three-dimensional model of the second object do not exceed dimensions of a print envelop of the three-dimensional printer, wherein the proportionality factor between the first dimensions and the second dimensions is maintained.

11. The computer program product of claim 1, further comprising:
scaling the dimensions of the first data file so that dimensions of the three-dimensional model of the first object do not exceed dimensions of a print envelop of a first three-dimensional printer;
scaling the dimensions of the second data file so that dimensions of the three-dimensional model of the second object do not exceed dimensions of a print envelop of a second three-dimensional printer, wherein the proportionality factor between the first dimensions and the second dimensions is maintained;
causing the first three-dimensional printer to form the three-dimensional model of the first object using the scaled dimensions of the first data file; and
causing the second three-dimensional printer to form the three-dimensional model of the second object using the scaled dimensions of the second data file.

12. The computer program product of claim 1, further comprising:
identifying a resolution capability of the three-dimensional printer;
identifying a resolution required by the first data file and the second data file; and
scaling the dimensions of the first data file and the second data file so that the three-dimensional printer can form the three-dimensional model of the first object and the three-dimensional model of the second object with the required detail level while maintaining the proportionality factor between the first and second objects.

13. The computer program product of claim 1, further comprising:
modifying a second color specified in the second data file to match a first color specified in the first data file.

14. The computer program product of claim 13, further comprising:
modifying at least a third color specified in the second data file to maintain a relative color association between the second color and the third color in response to the second color being modified to match the first color.

15. The computer program product of claim 1, further comprising:
substituting a second color for a first color specified in either the first data file or the second data file according to a predetermined color substitution rule.

16. The computer program product of claim 1, further comprising:
substituting a predetermined color for a first color specified in either the first data file or the second data file in response to the first data file or the second data file specifying a predetermined object type.

17. The computer program product of claim 1, further comprising:
scaling the dimensions of the first data file or the second data file by a further predetermined amount in response to the first data file or the second data file specifying a predetermined origin.

18. The computer program product of claim 1, further comprising:
creating the first data file from a picture of the first object including at least one known dimension or reference dimension.

19. The computer program product of claim 1, further comprising:
substituting a lighter material for a first material specified in either the first data file or the second data file and filling internal voids specified the first data file or the second data file in order to increase the weight of the three-dimensional model of the first object or the three-dimensional model of the second object.

* * * * *